United States Patent Office 3,521,738
Patented July 28, 1970

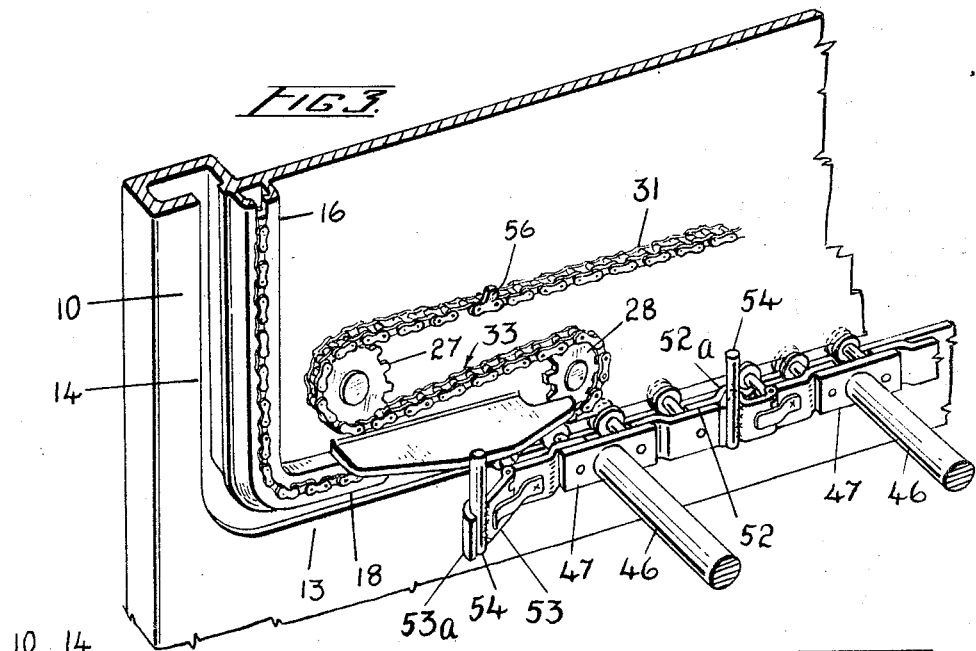
ized slices
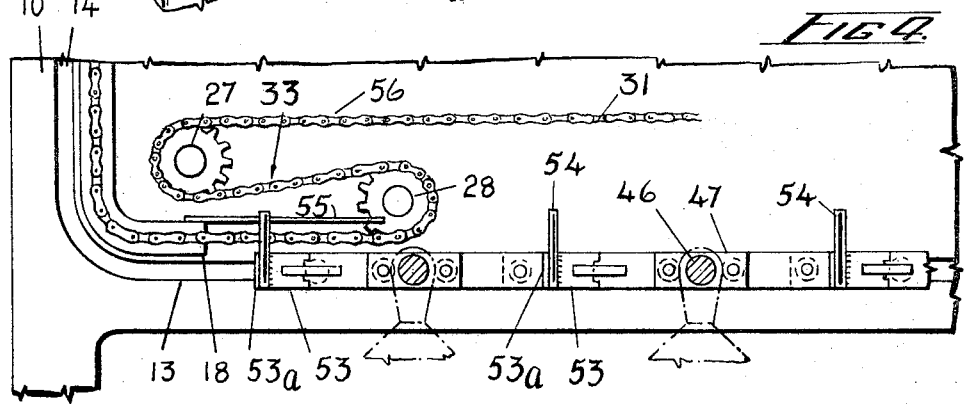
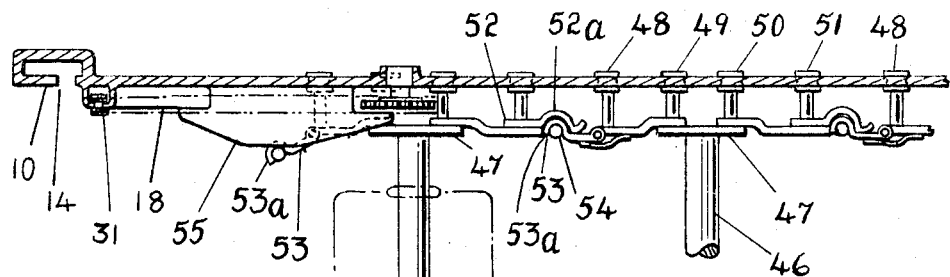
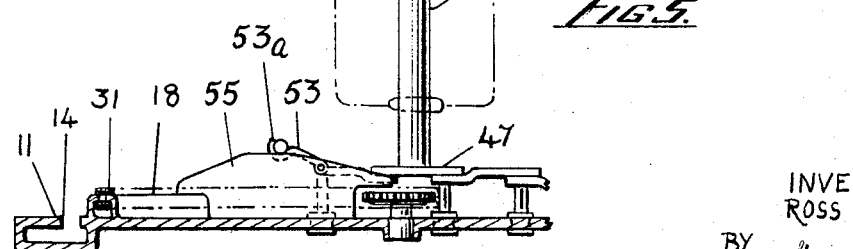

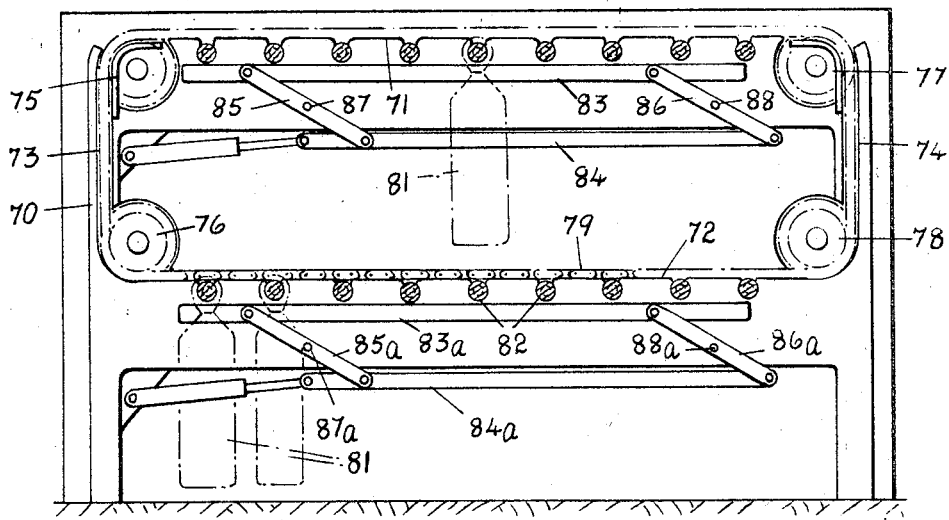
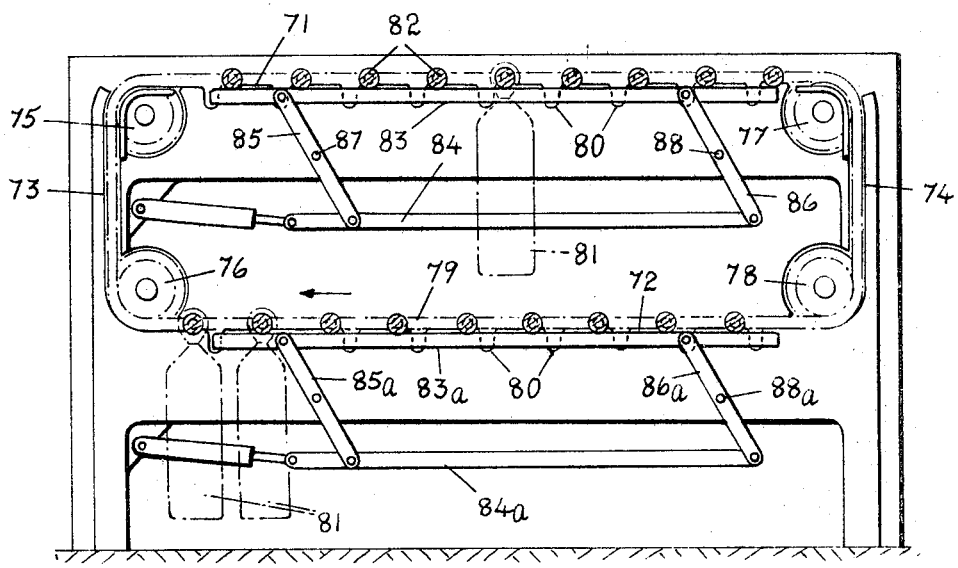
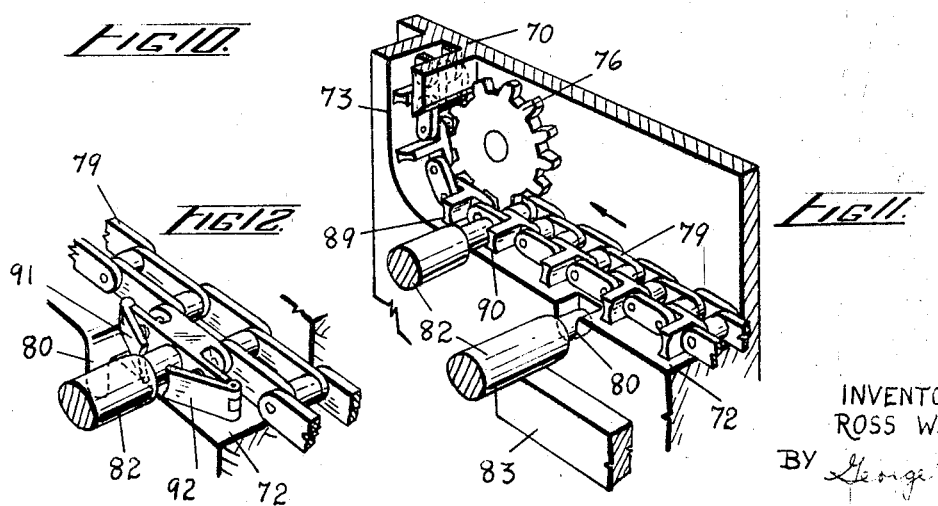

3,521,738
ENDLESS PATH STORAGE SYSTEM
Ross W. Coleman, 15 Vanley Crescent,
Downsview, Ontario, Canada
Filed Apr. 26, 1968, Ser. No. 724,410
Int. Cl. B65g 1/00
U.S. Cl. 198—85                               5 Claims

ABSTRACT OF THE DISCLOSURE

A total storage system in which the total cubic space occupied by the system is available for the storage of wares. The system employs a pair of closed-loop tracks having an upper and lower horizontal run connected by vertical runs. The horizontal runs support a plurality of mobile storage transfer members which completely occupy the upper and lower runs. The transfer members are coupled together to form an upper unit and a lower unit.

A single drive mechanism, operating at constant speed, and operable either in a clockwise or in a counter-clockwise direction is provided which will carry out the following sequence:

(a) move the transfer members of the upper and lower runs one increment;
(b) automatically disconnect the lead transfer members on the upper and lower runs and stop the remainder in the new position and be retained in that position until the lead transfer members complete their travel on the vertical runs and into the space left vacant on the upper and lower runs by the one increment movement.

This operating cycle is continued until the desired transfer member comes into a position which will permit the removal of the wares therefrom or the storage of wares therein.

BACKGROUND OF INVENTION

Conveyor systems for the storage of wares are well known such as those in use for the storage of vehicles and other uses which are exemplified in:

(a) Canadian Pat. 620,478, dated May 23, 1961 entitled "Vehicle Parking Means" granted to Abe Zaha with priority claim to United States application, filed Oct. 22, 1953.
(b) Canadian Pat. 756,424 dated Apr. 11, 1967 (corresponding to U.S.A. application Ser. No. 390,343, filed Aug. 18, 1964) inventors—Charles T. Breitenstein et al. for "Conveyor Belt Construction for Vending Machines."
(c) Canadian Pat. 689,929, dated July 7, 1964 to Otho A. Gibbons for "Storage Systems."

Reference will be made to the last mentioned Canadian patent which points up the problem experienced by the prior art devices where it is proposed to use all the storage space available, including the space between the ceiling and above the normal reach of a person which space is normally lost. Otho A. Gibbons in his patent proposes a two tier uni-directional system of upper and lower runs connected by vertical runs to effect a transfer between the upper and lower runs. The problem encountered here as in all cases of two tier systems is the avoidance of interference between the containers while a storage transfer member is making the vertical run. Gibbons' storage system employs two conveyor systems, one for the horizontal runs and a separate one for each vertical run, with the vertical runs operating at a higher speed than the horizontal runs.

The disadvantage of such a system resides in the fact that when the travelling storage transfer member which is travelling on the horizontal run is transferred to the vertical run there is a sudden acceleration of speed. This not only places a heavy starting load on the vertical conveyor mechanism but also a heavy deceleration load on the horizontal run when the member is transferred back to the horizontal run. Such a system requires heavy duty motors and other heavy duty parts. It also means that when the vertical rise takes place all units are moving, requiring much greater horsepower output.

A further problem is present in such constructions in that two separate conveyor systems, running at different speeds require that the two systems be synchronized. This requires building into such systems fail-safe features should one system fail or get out of phase.

The present invention solves the foregoing and other problems inherent in the prior art devices by the structures disclosed in the apparatus hereinafter described. The manner in which the problems are solved is briefly as follows:

(a) the storage system employs a closed-loop track having upper and lower horizontal runs connected by vertical runs;
(b) a single conveyor system operating at a constant speed for selectively moving mobile storage transfer members along the horizontal runs and the vertical runs;
(c) means disconnecting all of the transfer members which are positioned on the horizontal runs from the conveyor system except the lead transfer member of the upper and lower horizontal runs and retaining the disconnected transfer members immobile during the time the lead transfer members are making their vertical run between horizontal runs.

The present invention avoids heavy loads on the conveyor system during vertical rise. It also makes possible the use of lower horsepower motors, i.e. much lower than presently possible and also a much lighter conveyor system and related parts. It also removes the hazard to employees and of possible damage to equipment and stored wares of a fragile nature inherent in any device which has rapid acceleration and deceleration. It can reduce the size of the machine for the same cubic area of storage space.

The total storage system of the present invention comprises, in combination:

(a) a closed-loop track having an upper horizontal rail and a lower horizontal rail joined together at each end by vertical riser rails;
(b) a plurality of mobile storage transfer members guided on said rails for travel around the closed-loop track in either direction and occupying the total available space of the horizontal rails;
(c) means releasably coupling the mobile storage transfer members to form an upper storage unit guided by the upper rail and a lower storage unit guided by the lower rail;
(d) a single power driven conveyor means having an intermittent driving connection with at least the lead mobile storage transfer members at spaced intervals to move each unit one increment;
(e) means automatically disconnecting the lead mobile storage transfer member from the next following mobile storage transfer member to permit independent travel of the disconnected transfer member from one horizontal rail to the other horizontal rail;
(f) means restraining movement of the remainder of the units during the time that the disconnected lead mobile storage transfer members travel on the vertical riser rails during transfer between the horizontal rails; and
(g) repeating the cycle until the desired transfer member is brought to a selected position.

DESCRIPTION OF INVENTION

The construction of the invention is set forth in the following disclosure which includes the accompanying drawings that illustrate three alternative structures for accomplishing the same. It is to be understood that the three structures are shown by way of illustrating the invention and is not to be construed as limiting the invention thereto. It is to be understood that a person skilled in the art to which the invention relates can devise modifications without departing from the scope of the invention defined by the claims which appear at the end and form part of this specification.

In the drawings:

FIG. 1 illustrates the storage system of the present invention, hereinafter referred to as the first storage system, with the left hand mobile storage member, herein referred to as lead storage member of the lower storage unit and diagonally opposite lead storage member of the upper storage unit, in the process of being transferred from the upper and lower rails respectively, as hereinafter described, in the direction of the arrows.

FIG. 3 is a fragmentary enlarged perspective view of the lower left hand corner of one of the pair of closed-loop tracks to show details of construction more clearly than shown in FIGS. 1 and 2, with the parts in the same position as illustrated in FIG. 1.

FIG. 4 is a side elevation of the lower left hand corner of the closed-loop track shown in FIG. 3.

FIG. 5 is a fragmentary top plan view of the storage system shown in the preceding figures.

FIGS. 9, 10, 11 and 12 illustrate a third storage system constructed in accordance with the invention, which will be hereinafter particularly described.

Figure 2:
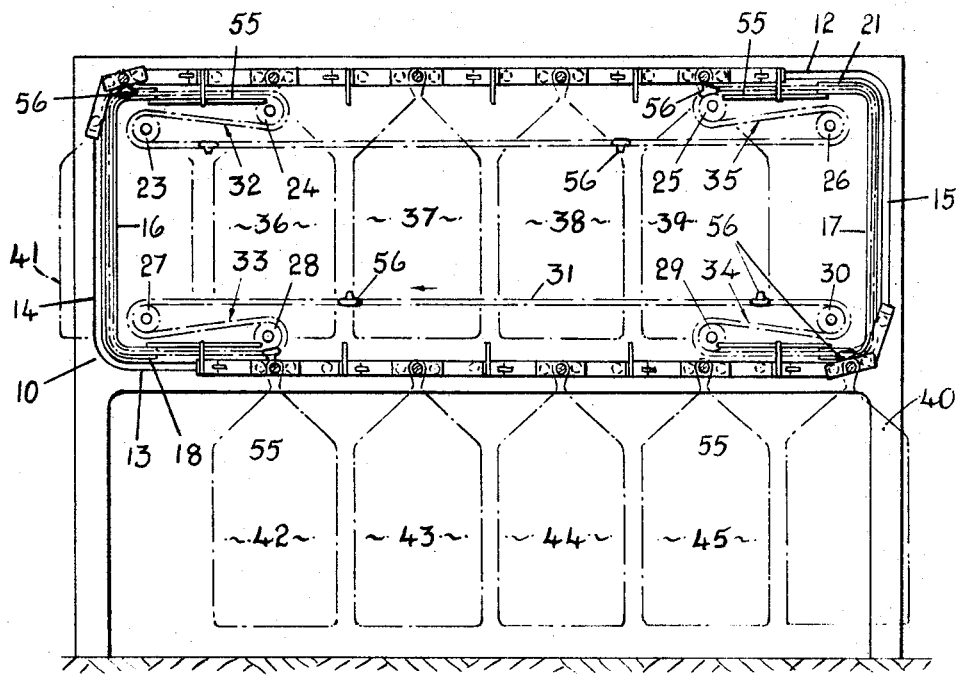
FIG. 2 illustrates an apparatus of FIG. 1 with the upper and lower storage units immobile and two lead members travelling recoupled on the vertical runs.
Figure 1:
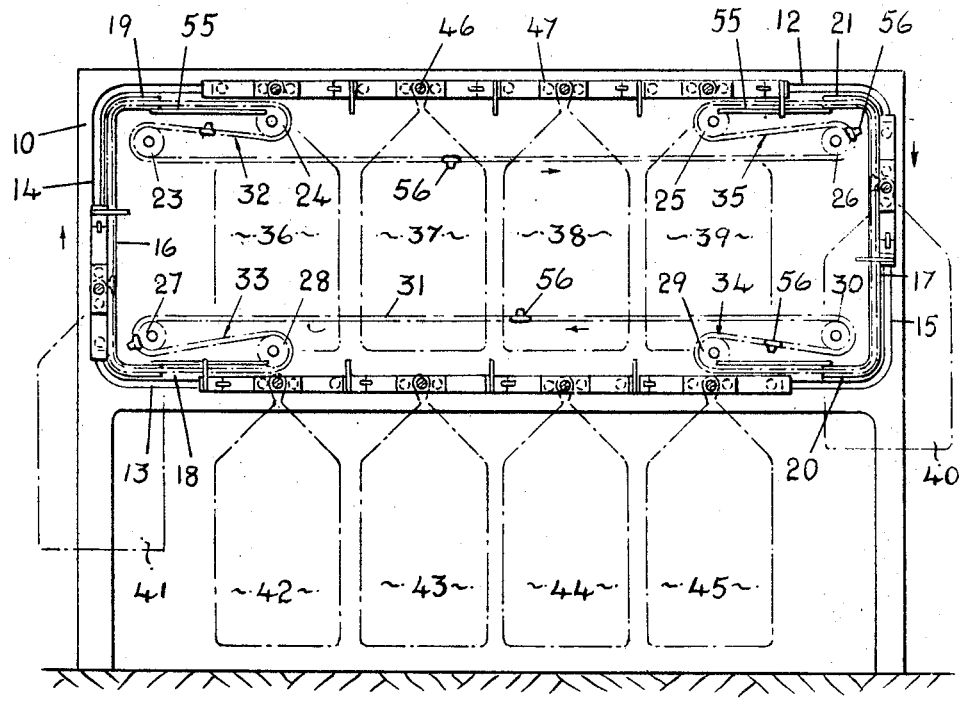
Figure 7:
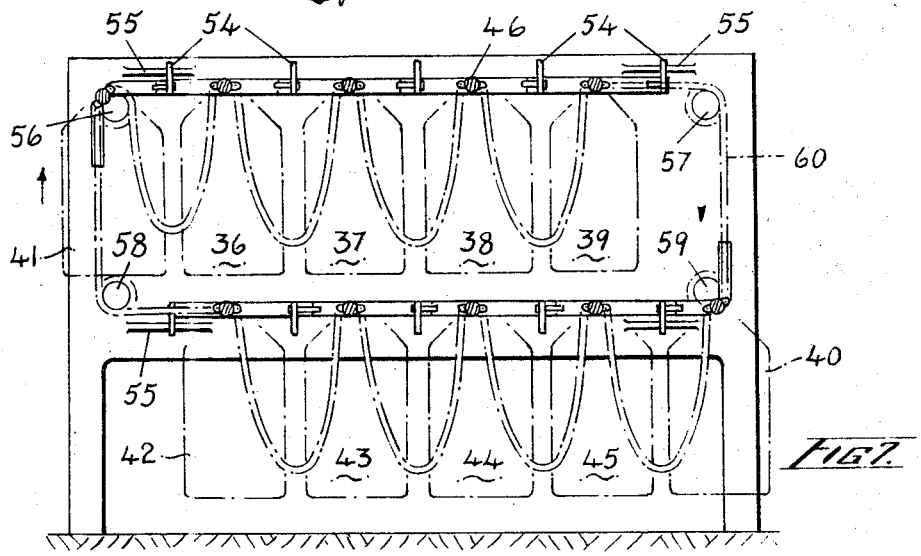
Figure 6:
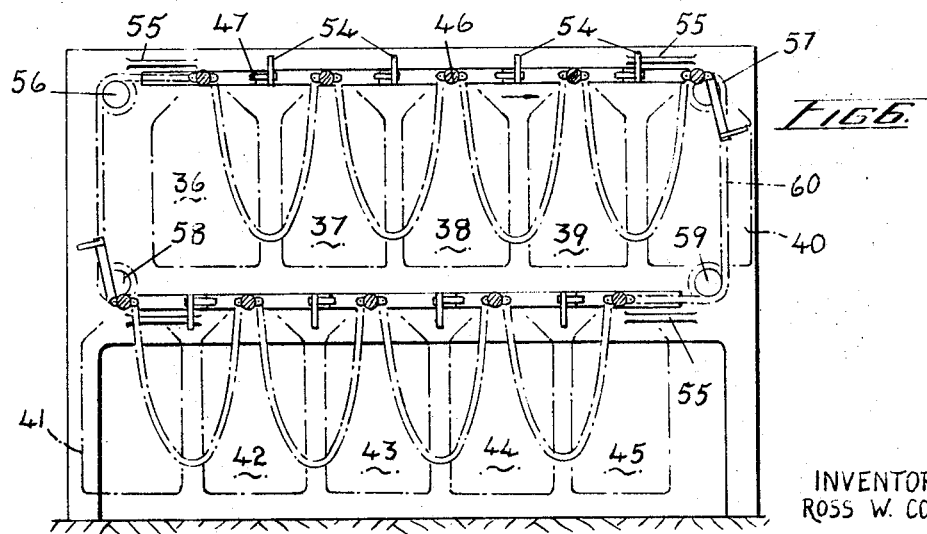

In each of the foregoing structures FIGS. 2, 6 and 9 show all mobile storage members, immobile, under normal storage conditions. FIGS. 1, 7 and 10 show the system in motion for the purpose of bringing a storage member to a position which is convenient for removal of the wares stored therein or for storing wares therein. It is assumed for the purpose of this description that, when in motion, the storage members move in the direction of the arrows. However the system may be operated in either direction depending on the particular control. In FIGS. 1 and 2, the control will be designed to operate the system in the direction which will require the required storage member to travel the shortest distance for removing wares therefrom or storing wares therein. As the particular type of control will be dictated by the particular use requirements of the system and as the same does not form part of the present invention, the same will be described as being under manual control.

The second storage system, in the present illustration, is designed to operate in both directions. The third storage also operates in either direction.

By way of further introduction to the systems, it is mentioned that the conveyor system is driven by a constant speed electric motor controlled by a manually operated switch. As the same is conventional neither the motor or the switch has been shown.

The total storage system illustrated in FIGS. 1 to 5 inclusive comprises a pair of closed-loop tracks 10, 11, the track 11 being the mirror image of the track 10 in all respects. Consequently it is only necessary to describe the construction of the closed-loop track 10. The track 10 includes an upper horizontal rail 12 and a lower horizontal rail 13 connected together at each end by vertical riser rails 14, 15. Consequently there is a pair of spaced apart, parallel horizontal upper and lower rails 12, 13 forming upper and lower runs; the upper and lower rails of each pair being interconnected at each end by the vertical riser rails 14, 15, said rails forming the vertical runs.

Adjacent each vertical riser rail are vertical riser conveyor guides 16, 17 having stub extensions 18, 19, 20, 21, respectively with a radius at the junction of the extension with its respective tracks 16, 17.

Mounted on each of the tracks 10, 11 within the area enclosed by the upper and lower runs is a conveyor system arranged in horizontally spaced apart pairs, the vertical spacing being dictated by the length of the vertical runs. In the present illustration the conveyor system comprises two sprocket systems, one for each track, each sprocket system comprises four pairs of sprocket wheels 23, 24: 25, 26: 27, 28: and 29, 30 for each of the tracks 10, 11; one pair being located adjacent each junction of a horizontal run with a vertical run, and an endless chain drive 31 which winds around the sprocket wheels of each sprocket system as shown.

It is only necessary to drive one sprocket wheel of each system by conventional means, such as an electric motor which in its simplest form is controlled by a manually operated electric switch. Neither the motor nor switch is shown. However for the purposes of this description, it is assumed that the sprocket 23 of each sprocket system is so driven.

It will be noted that the chain drive 31 has four looped sections 32, 33, 34 and 35 where the drive winds around the respective pair of sprocket wheels. The purpose of this is to provide a chain of the required length within the confines of the machine since there is a relationship between the size of the transfer members, width, height and number of transfer members, in the machine. The endless chain drive 31 during its vertical runs rides in the guide tracks 16, 17, being guided thereinto by the stub extensions.

A plurality of mobile storage transfer members are mounted on the upper and lower rails and are normally immobile. In the present illustration, there is shown 10 transfer members 36, 37, 38, 39 on the upper rails and 42, 43, 44, 45 on the lower rails with 40 and 41 (FIG. 1) detached and traversing the vertical runs in the direction of the arrows. The upper and lower rails are each of a length to support five of the transfer members when immobile.

The transfer members are identical in construction. Consequently only one will be described in detail. Each transfer member comprises a hanger 46 having mounted on each end thereof a centrally articulated truck 47 which is supported on four grooved wheels which ride on the tracks. Each truck carries front and rear coupling devices which mate with a complemental coupling device carried by adjacent trucks. In the present embodiment, one end of the truck 47 carries a fixed plate 52 formed with an arcuate recess 52a and on the opposite end a spring biased latch 53 which has an arcuate projection 53a. This provides an automatic couple when two adjacent members are brought into juxtaposition as hereinafter described.

Since it is proposed to drive the conveyor system in either direction, a release mechanism for actuating latches 53 to release the couple is provided at each end of the upper and lower horizontal tracks 12, 13. For this purpose each latch 53 is provided with an upright pin 54 which rides against a fixed latch release plate 55 located as shown. In each case the release mechanism is positioned inwardly from the vertical runs, the position of the release mechanism being selected which will allow the transferred transfer members to become recoupled to the respective end transfer members stationed on the horizontal runs after their vertical runs have been completed.

The automatic engagement of each conveyor 31 with one or the other of the end transfer members is effected, in the present illustration, by fingers 56 which are modularly spaced as hereinafter described. The looped sections 32, 33, 34, 35 also provide, in the present illustration, a means for automatically bringing the appropriate fingers 56 into engagement with a part of the truck 47 of the transfer members 39, 42 and simultaneously actuate a releasable lock, carried on the track, said lock holding all of the transfer members immobile while the two uncoupled units as herein described travel over the vertical runs. At the end of the vertical run the looped sections also provide an automatic release of the fingers from engagement with the respective truck 47. The transfer members must be an even number and the fingers must be a minimum of 4.

The operation of the apparatus shown in FIGS. 1 to 5 inclusive will now be described.

The total storage system shown in FIGS. 1 to 5 is operated in the following manner. The system will be assumed to be operating in the direction of the arrows and under those conditions the transfer member 39 which is located on the upper track and the transfer member 42 on the lower track will be deemed to be the lead transfer units. The lower left hand end will be deemed to be the end from which the transfer members will be loaded and unloaded. In that situation the transfer member 42 is in the unloading position in which position it is readily accessible for removal or storage of wares. Now let us assume that it is desired to remove the contents which are contained in the transfer member 39. In that case the transfer member 39 must be moved down to the position presently occupied by the storage member 42.

In that case the operator will actuate the switch to start the motor driving the sprockets 23 to move the conveyor system in the direction of the arrows. In fact, as illustrated in FIGS. 1 and 2 the operator has commenced that very operation. It will be seen that the storage container 40 is moving in a direction to bring it down to the lower track 13 while the storage container 41 is moving to the upper track. FIG. 1 shows the transfer member 41 at the commencement of its rise and FIG. 2 shows it recoupled on the upper track. The container 40 is shown in the opposite position as traversing downwardly towards the lower track. Since movement of the upper and lower transfer members is simultaneous, it will only be necessary to describe the travel of the transfer member 41. As the container 41 reaches the adjacent end of the transfer member 36 the trucks will recouple simultaneously with the recoupling of transfer members 41, 40. When that takes place the fingers 56 positioned on the drive 31 which by then have reached the upper right hand and the lower left hand corner respectively, will engage with trucks 47 of the transfer members 39 and 42 respectively to move the full assembly one increment and thus clear the way for the transfer of the transfer members 39, 42 to the lower and upper runs respectively. The machine has two increments, the horizontal increments being short while the vertical increment is substantially long, extending from the center of sprocket 28 to the mid-point of the radius in the upper left corners. As each of the transfer members 39, 42 approach the vertical run, the pin 54 carried by the latch 53 rides over the latch release plate 55 releasing the pin 54 from the notch 52. A releasable lock automatically engages the truck of the transfer members 38 and 43 which have moved into the positions previously occupied by the transfer members 39, 42 respectively.

As soon as the transfer members 38, 43 have been moved to the bottom and top rails respectively, the action previously described will be repeated and this will be continued as long as the motor is driven. In the present instant the motor will be stopped when transfer members 39, 40 have reached the position presently occupied by transfer members 42, 39 respectively in FIGS. 1 and 2.

SECOND STORAGE SYSTEM

Figure 8:
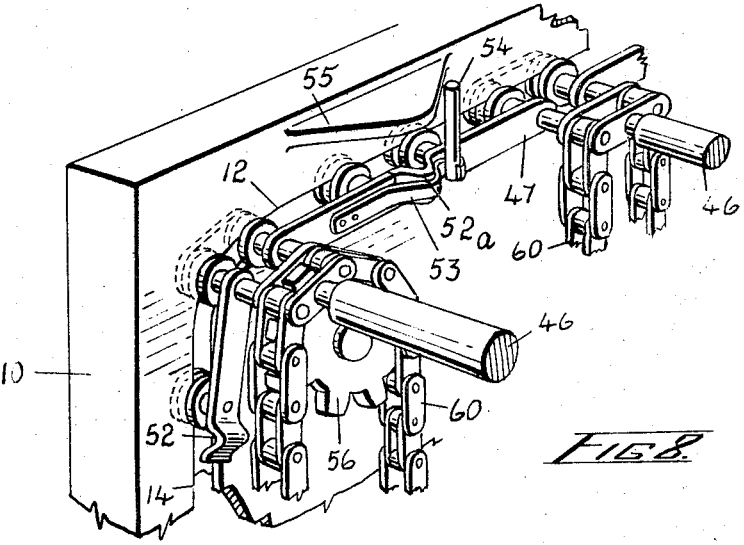
FIGS. 6, 7 and 8 illustrate a second storage system constructed in accordance with this invention in which the storage members are linked together by a conveyor chain which has slack sections between each storage member for the purpose herein described and defined.

The system disclosed in FIGS. 6 to 8 inclusive operates generally in a manner similar to that shown in FIGS. 1 to 5. The parts which are the same will be indicated by the same reference numbers as in FIGS. 1 to 5 inclusive and are included by such reference.

In this alternative system, there is provided at each corner of each one of the pair of closed-looped tracks sprocket wheels 56, 57, 58, 59 forming two systems, one for each closed-looped track and power driven at a uniform rate of speed. The two systems are preferable to one to ensure that the trucks travel smoothly along the tracks. Of course, one system would suffice for installations where light loads are encountered. An endless conveyor belt consisting of a chain drive 60 is mounted on and driven by each set of sprocket wheels, the chain drive having upper and lower runs and vertical runs which parallel the rails. Each transfer member is connected to the chain drive 60, the length of the chain drive between each connection being about equal to the length of a vertical riser plus about the width of one of the transfer members in the direction of travel. When the transfer members are coupled the chain drive will form slack loops between the connections and vertical runs of the chain drive between the sprocket wheels 56, 58 and 57, 59 respectively will be taut as shown in the drawings.

OPERATION OF SECOND STORAGE SYSTEM

The operation of the second storage system will now be described. It operates much in the same manner as the previously described first storage system. In this structure it is to be assumed that the selection of the transfer member is being made by operating the system in the direction indicated by the arrows. The operator will start the motor to turn the sprockets 56, 57, 58 and 59. The taut portion of the conveyor belt will move the coupled transfer members one increment in the direction of the arrow and as the pin 54 comes in contact with the release plate 55 the transfer members 40 and 41 will become uncoupled and then travel over the vertical risers to transfer from the lower and upper horizontal rails respectively. The looped portion of the conveyor belt between the storage members 41, 42 and 40 and 39 will gradually be taken up until they become taut and the coupled transfer members 36, 37, 38, 39, 42, 43, 44, 45 will move one increment in the direction of the arrows. FIG. 7 shows the storage members 40, 41 transferred to their new positions and recoupled ready for the next cycle.

This operation can be continued until the desired transfer member is brought into the position presently occupied by transfer member 42 in FIG. 1, for example, the transfer member 39.

THIRD STORAGE SYSTEM

This system is illustrated in FIGS. 9 to 12 inclusive and applies the same general principle as is disclosed in the preceding systems, namely using a conveyor belt travelling at a constant speed and retaining the transfer members on the upper and lower runs immobile while transfer members are travelling on the vertical runs.

This embodiment comprises a pair of spaced apart closed loop tracks 70, only one being shown, in spaced apart relationship, each track having upper and lower runs 71, 72 respectively joined by vertical runs 73, 74.

Sprocket wheels 75, 76, 77 and 78 are mounted on each closed-loop track, one each at the junction of the horizontal and vertical runs and support a conveyor belt 79. Only one of each of sprocket wheels of each track need be driven. The upper and lower runs are provided with modularly spaced pockets 80 equal in number to the number of transfer members to be accommodated on the upper and lower runs respectively.

Each run supports a plurality of transfer members 81, each of which is supported on a hanger 82 having its opposite ends supported on the oppositely disposed runs of the closed-loop track 70. The ends of the hangers are reduced in diameter to drop into the pockets and also to provide shoulders which abut against the vertical walls of the closed-loop track to prevent longitudinal movement of the hangers 82. When located in the pockets the hanger ends are out of engagement with the conveyor belt 79. When it is desired to move the transfer members one or more increments, means are provided for bringing the hangers 82 into engagement with the conveyor belt 79, said means comprising, in the present modification, a pair of first horizontal bars 83, 84 one of each pair being associated with one of the closed loop tracks, each pair of bars being linked together by a pair of levers 85, 86 which are pivotally mounted at 87, 88 to a stationary part of the structure associated with the upper run and a second pair of horizontal bars 83a, 84a, one for each closed loop track, associated with the lower horizontal run, the bars being linked together by a pair of levers 83b, 84b pivotally mounted at 87a, 88a to a stationary part of the structure. The bars 83, 83a lie under the respective ends of the hangers supported on the upper and lower runs. Means are provided for actuating the bars 83, 83a to lift the ends of the hangers out of their respective pockets into one of the plurality of pockets formed by spaced lugs 89, 90 carried by the conveyor belt 79. A structure which does not require accurate synchronization between the belt and the bar actuating mechanism is illustrated in FIG. 12. In that structure the belt 79 is provided with a plurality of connecting members each member comprising a pair of spring biased gripping members 91, 92 which slope upwardly towards each other with a gap between their adjacent ends. The members 91, 92 are biased to the up-position as shown. It will be thus seen, with the belt 79 travelling in either direction, the end of the hanger will ride over and depress the gripping member 92 or 91, depending on the direction of travel, until it registers with the gap, at which time its connection with the belt will be complete. The hanger will remain in such engagement until the end comes into registration with the next adjacent pocket 80 at which time it becomes disconnected.

The bar actuating means comprises hydraulic members 93, 94 which are connected to the bars 84, 84a respectively. The operation of the hydraulic member is controlled by a suitable control mechanism (not shown) which will actuate the bar actuating means into its raised position for a time period of sufficient length to engage the chain and move out of alignment with the respective pocket. All of the transfer members will move one increment and return it to its inoperative position where it will remain until the two transfer members which are traversing the vertical runs during transfer between horizontal runs have completed their runs. The time control system has not been described since it does not form a part of the present invention and the construction of a control system would be within the knowledge of a skilled person.

OPERATION OF THE THIRD STORAGE SYSTEM

It operates on the same general principle as has been disclosed for the other two systems and therefore it is unnecessary to describe the storage system illustrated in FIGS. 9 to 12 inclusive in the same detail as the previous systems.

When it is desired to move the transfer members from one run, i.e., from the upper run to the lower run in order to bring a particular transfer member into a position where it is available for removal of the wares stored therein or to use it for the storage of new wares, the operator actuates a switch which starts the motor which operates the system as a whole including the time control mechanism which controls the other related parts. The first thing that happens is that the conveyor belt 79 starts to move in the direction indicated by the arrows in FIGS. 9 and 10. The time control then operates the hydraulic members 93, 94 which in turn raises the bars 83, 83a lifting, the ends of the hangers 82 into engagement with the upper and lower runs of the belt 79. As soon as the hangers move out of alignment with the pockets 80 the control member releases the hydraulic mechanism and drops the bars 83, 83a so that they are no longer in engagement or in a position to engage the ends of the hangers 82. The belt will move all of the hangers one increment and after moving that increment they will again drop into the pockets 80 until such time as the two end hangers which are being transferred from one of the horizontal rails to the other has completed its journey and it becomes lodged in one of the pockets on the opposite rail. For example, with reference to FIG. 10, the transfer member which has been indicated by the letter A will complete its travel up the vertical run at the lefthand end and the ends of the bar ends will become lodged in the pocket identified by the letter B. Until that occurs the bar actuating means is locked in an inoperative position. As soon as the transfer member A has reached the point B, the system can then be operated again to repeat the cycle of operation.

SUMMARY

Any one of the aforementioned systems can be operated and provided with means to carry out an operation of selection whereby the transfer members are coded and by a simple operation, the operator can turn a dial to a desired position which will bring a desired transfer member to a position where it can be either unloaded or loaded with wares.

The foregoing sets forth three embodiments of my invention each of which employ the same inventive idea, that is, of having a constantly driven conveyor belt which, requires only one motor and employs the principle of stopping all of the transfer members during the period that lead transfer members are making the vertical run between the horizontal tracks.

It will be apparent to those skilled in this art that the invention is subject to modifications and the same can be done without departing from the ambit of the appended claims.

What I claim is:

1. A total storage system comprising, in combination:
    (a) a closed-loop track having an upper horizontal rail and a lower horizontal rail joined together at each end by vertical riser rails;
    (b) a plurality of mobile storage transfer members guided on said rails for travel around the closed-loop track in either direction and occupying the total available space of the horizontal rails;
    (c) means releasably coupling the mobile storage transfer members to form an upper storage unit guided by the upper rail and a lower storage unit guided by the lower rail, each mobile storage transfer member comprises a horizontal support member extending between the closed-loop tracks, a wheeled truck mounted on each end of the horizontal support, said wheels riding on said tracks, and the releasable coupling comprises a two part coupler, one part being mounted on one end of the truck and the other part being mounted on the opposite end, one part of the two part coupler comprises a fixed plate formed with a vertical channel and the other part comprises a hinged plate formed with a vertical projection complementary to the vertical channel, and biasing means urging the hinged plate of one transfer member to engage the fixed plate when two such transfer members are in abutting relationship;
    (d) a single power driven conveyor means having an intermittent driving connection with at least the lead mobile storage transfer members at spaced intervals to move each unit one increment;

(e) means automatically disconnecting the lead mobile storage transfer member from the next following mobile storage transfer member to permit independent travel of the disconnected transfer member from one horizontal rail to the other horizontal rail;

(f) means restraining movement of the remainder of the units during the time that the disconnected lead mobile storage transfer members travel on the vertical riser rails during transfer between the horizontal rails; and (g) repeating the cycle until the desired transfer member is brought to a selected position.

2. A total storage system according to claim 1 in which the conveyor means comprises:

(h) an endless power driven belt supported by each main track, said belt having upper and lower runs interconnected by vertical runs, the upper and lower runs being further characterized by a looped portion at each end of the upper and lower runs respectively whereby the length of the upper run is equal to the combined length of the upper run and one of the vertical runs and the length of the lower run is equal to the combined length of the lower run and one of the vertical runs;

(i) latching members carried by the belt in spaced relationship and positioned to selectively engage the leading mobile transfer members on the upper and lower rails and couple said support member to said belt whereby the upper and lower storage units are advanced one increment; and (j) means actuating said latching members from engagement when each of the leading transfer members recouples itself to its respective trailing transfer member.

3. A total storage system according to claim 1 in which the conveyor means comprises:

(h) a sprocket wheel mounted adjacent each junction of the upper and lower rails with the respective riser rails forming two sets of sprockets, one set being associated with one of the pairs of closed-loop tracks and the other set being associated with the other of said pair of said tracks including means for driving said wheels;

(i) an endless sprocket chain mounted on each set of sprockets, said chains having upper and lower horizontal runs connected by vertical runs, said chains connecting each of said mobile storage transfer members to an adjacent transfer member, with sufficient slack, in the horizontal runs, between each connection with an adjacent transfer member to permit the lead transfer members of the upper and lower units when disconnected to travel the length of the riser rails and be transferred to the respective upper and lower rails to thereby reform as upper and lower storage units and move each unit one increment.

4. A total storage system comprising, in combination:

(a) a closed-loop track having an upper horizontal rail and a lower horizontal rail joined together at each end by vertical riser rails;

(b) a plurality of mobile storage transfer members guided on said rails for travel around the closed-loop track in either direction and occupying the total available space of the horizontal rails;

(c) means releasably coupling the mobile storage transfer members to form an upper storage unit guided by the upper rail and a lower storage unit guided by the lower rail;

(d) a single power driven conveyor means having an intermittent driving connection with at least the lead mobile storage transfer members at spaced intervals to move each unit one increment;

(e) means restraining movement of the remainder of the units during the time that the disconnected lead mobile storage transfer members travel on the vertical riser rails during transfer between the horizontal rails;

(f) a sprocket wheel mounted adjacent each junction of the upper and lower rails with the respective riser rails forming two sets of sprockets, one set being associated with one of the pairs of closed-loop tracks and the other set being associated with the other of said pair of tracks including means for driving said wheels;

(g) a pair of endless chains, one of each pair of chains being mounted on its respective set of sprocket wheels, each chain having upper and lower horizontal runs connected by vertical runs.

(h) a plurality of modularly spaced notches in the upper and lower rails;

(i) connecting members carried by each mobile storage transfer member, said connecting members riding on said track in engagement with said chains when travelling one increment in either direction and dropping into said notches at the end of said travel to automatically disengage the connecting members from said chains and restrain movement of the transfer members so disengaged; and (j) means raising said connecting members into engagement with the endless chains.

5. A total storage system according to claim 4 having means releasing said coupling, said releasing means comprising a pin carried by the hinged plate and a cam member mounted on said closed-loop track adjacent a vertical run over which said pin rides to thereby release said coupling.

References Cited

UNITED STATES PATENTS

| | | | |
|---|---|---|---|
| 1,458,881 | 6/1923 | Gromer | 214—16.1 X |
| 1,782,410 | 11/1930 | Cook | 214—16.1 X |
| 3,036,690 | 5/1962 | Kirchhofer | 214—16.4 X |

FOREIGN PATENTS 464,013  4/1937  Great Britain.

GERALD M. FORLENZA, Primary Examiner

R. B. JOHNSON, Assistant Examiner

U.S. Cl. X.R.

214—16.4